Nov. 8, 1949  E. B. GEORGE ET AL  2,487,328
DYNAMOELECTRIC MACHINE
Filed Dec. 27, 1943  5 Sheets-Sheet 5

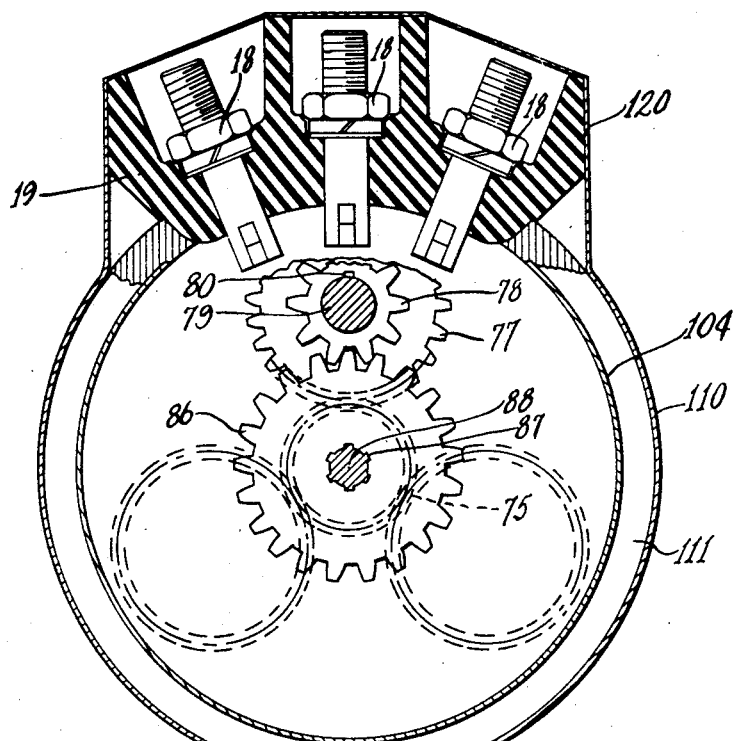
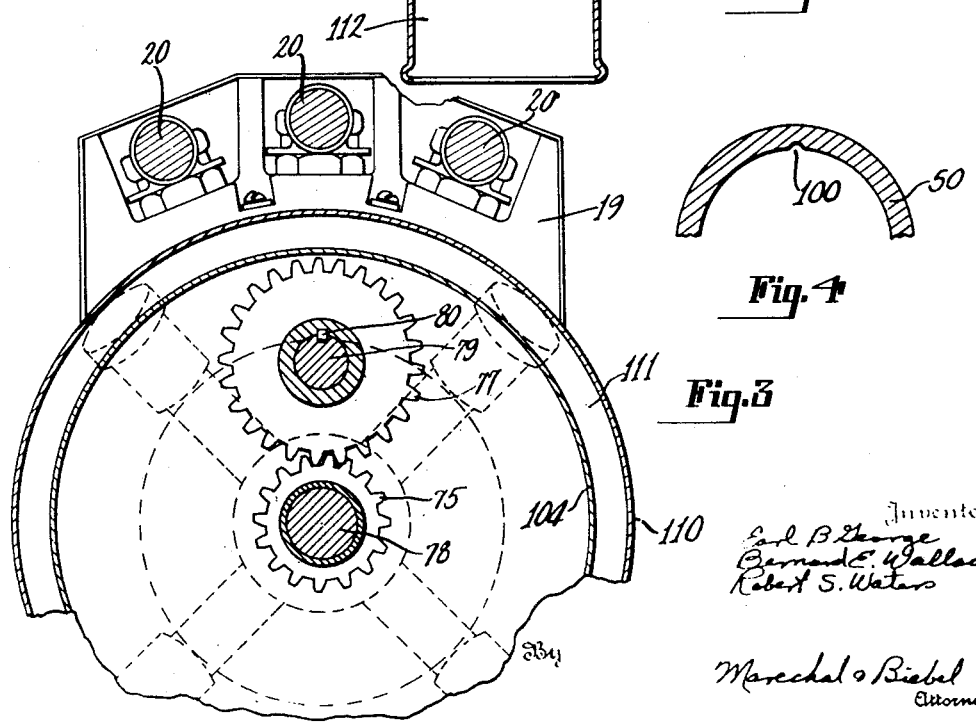

Inventors
Earl B. George
Bernard E. Wallace &
Robert S. Waters

Marechal & Biebel
Attorneys

Patented Nov. 8, 1949

2,487,328

UNITED STATES PATENT OFFICE 2,487,328

DYNAMOELECTRIC MACHINE

Earl B. George, Bernard E. Wallace, and Robert S. Waters, Dayton, Ohio, assignors to The Leland Electric Company, Dayton, Ohio, a corporation of Ohio Application December 27, 1943, Serial No. 515,716

4 Claims. (Cl. 171—252)

1

This invention relates to dynamoelectric machines and more particularly to generators.

It is the principal object of the invention to provide a compact, light-weight, relatively high speed generator or alternator adapted for aircraft installations and arranged to be driven from a lower speed source of power such as the aircraft engine.

It is a further object to provide such a dynamoelectric machine which incorporates within itself a self-contained power transmission mechanism for actuating the rotating element thereof at a predetermined relatively increased speed with respect to the drive shaft.

It is also an object to provide a small and compact alternator having its rotor supported on a sleeve which is operated at a predetermined increased speed with respect to an internally located drive shaft by means of compact, self-contained gearing.

It is a further object to provide a frame construction for such a machine which is light in weight, and which can be manufactured easily and inexpensively while assuring a high degree of accuracy and alignment in the driving parts.

It is a still further object to provide a winding and method of assembling the same which is simple and easy in manufacture, which provides for the use of preformed coils in relatively narrow slots with the attainment of a high filling factor of the slots, and which requires a minimum of space at either end of the motor beyond the actual slots.

Other objects and advantages will be apparent from the following description, the accompanying drawing and the appended claims.

In the drawing,

Fig. 2 is a vertical sectional view on the line 2—2 of Fig. 1;

Fig. 3 is a partial vertical sectional view on the line 3—3 of Fig. 1;

Fig. 4 is a broken sectional view through the sleeve member;

Fig. 5 is an end elevational view of the frame structure for receiving the internal gearing;

Figure 1:
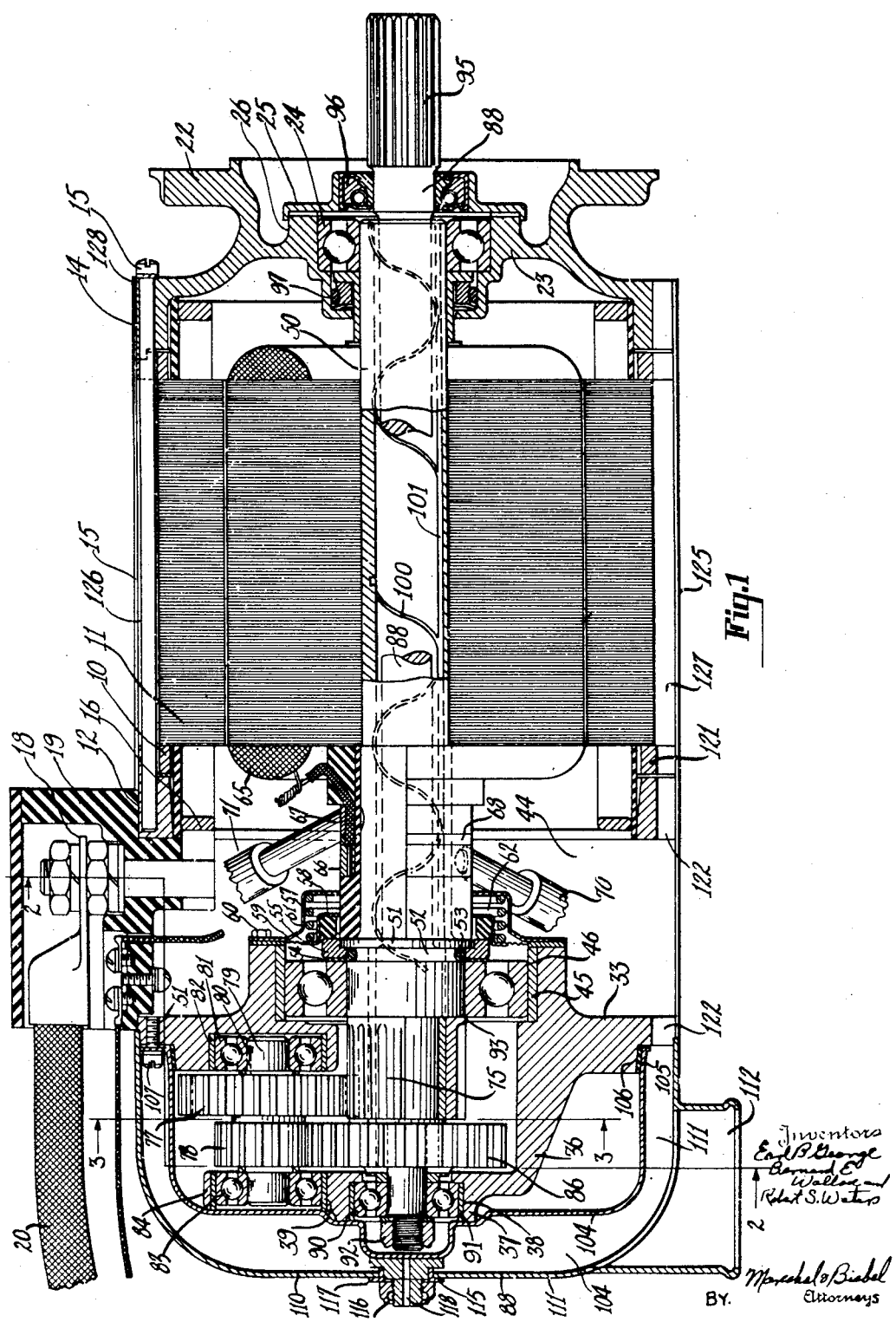
Fig. 1 is a sectional view through a dynamoelectric machine constructed in accordance with the present invention.
Figure 6:
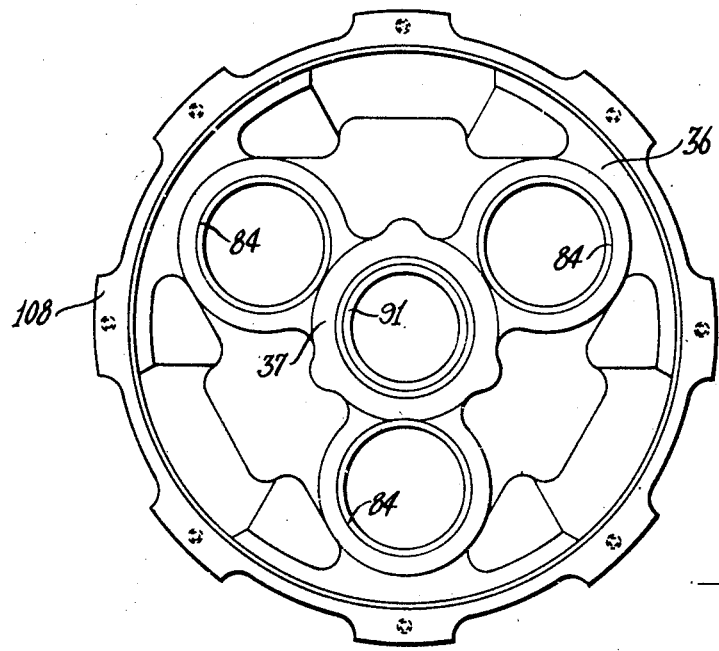
Fig. 6 is a side elevational view of the frame.
Figure 7:
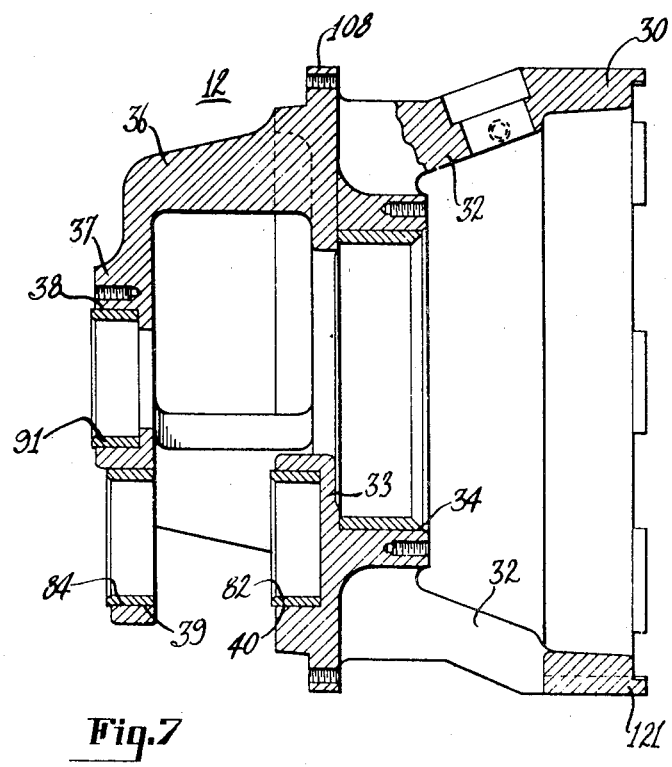
Fig. 7 is a broken sectional view of the frame.
Figure 6:
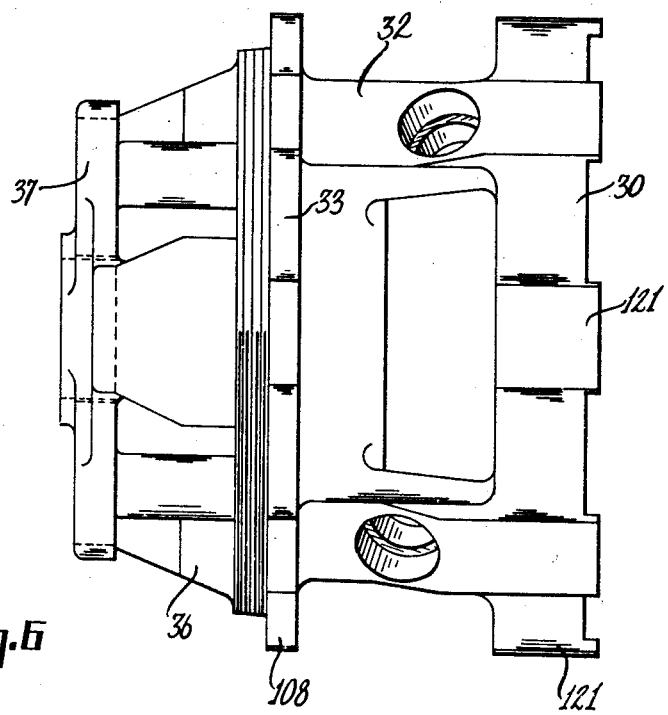
Figure 8:
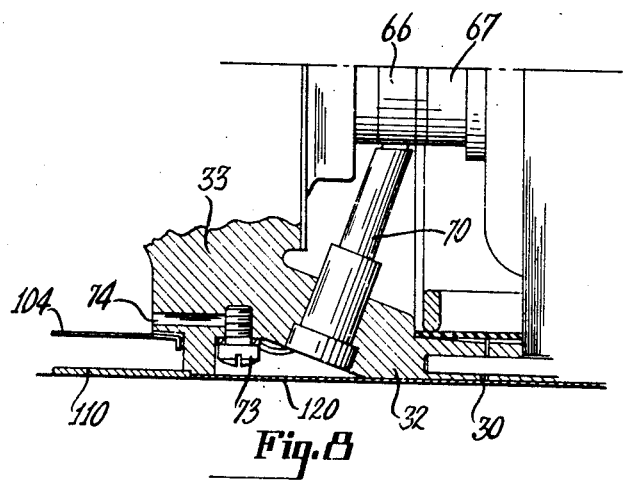
Fig. 8 is a detail sectional view of the support for the brushes.

Referring to the drawing which discloses a preferred embodiment of the invention, the casing forming the main frame of the motor comprises a central part 10 within which are placed the stator laminations 11. To one end of the member 10, there is bolted the frame member 12 which also provides a support for the self-contained gear drive, and to the other end there is bolted the end plate 14, through bolts 15 providing for retaining the parts of the frame in assembled relation. All three sections of the frame are preferably made of light metal and made of webbed and apertured construction to reduce the weight to a minimum. The stator windings are shown at 16 in the form of individual conductors of generally rectangular cross-section in order to obtain the maximum utilization of the slots. A three phase winding is illustrated by way of example, three leads 17 being brought out to binding posts 18 suitably housed within a terminal block 19 which is preferably formed as an integral molded piece formed with three wells for receiving and separately insulating the binding posts. The block 19 is slipped into position in an aperture at the upper surface of frame 12. Binding posts 18 are connected respectively to the cables 20 for the delivery of the generated current.

End plate 14 is formed integrally with an outwardly extending flanged portion 22 which is adapted to be bolted to a corresponding flange of a drive element, in order to support the unit from the housing of an engine, or the like. The end plate 14 is also formed integrally with an inwardly extending web portion 23 which is recessed to provide a seat for ball bearing 24, the bearing being retained in place by means of the annular cap 25 which is secured over the flange portion 26 of the end plate.

The opposite frame member 12 is formed with an annular portion 30 which is bolted against the central frame member 10. A series of integral connecting arms 32, preferably four in number and equally spaced around the periphery, extend from the portion 30 to an intermediate part 33, which is provided with a central bore 34 of relatively large diameter. Additional integral arms 36 extend from the part 33 to an end web 37 which is thus securely supported in fixed relation thereto. The end web is provided with a central bore 38, and with a plurality of outwardly located bores 39, preferably three in number and located symmetrically. In line with each of the bores 39 and located in intermediate part 33 are a series of bores 40 of the same size and in the same corresponding relation. It will be understood from the above that the frame member is a skeleton-like structure and that while it is relatively light in weight, it has high strength, the several arms and other parts being webbed and otherwise formed to develop a high strength to weight ratio. The part is preferably formed as an integral casting of light weight metal such as aluminum alloy, and may be easily and inexpensively finished to a high degree of accuracy, all of bores 38, 39 and 40 preferably being made at one time, thus speeding up the operation as well as providing greater accuracy of location and alignment.

The intermediate web portion 33 forms a shoulder at the end of bore 34 against which is seated a ring 45 inwardly of which is located the ball bearing 46.

The two ball bearings 24 and 46 provide for rotatably supporting a sleeve element 50, the respective inner races of the bearings being pressed over the sleeve or otherwise appropriately fitted thereto. In order to seal the chamber containing the bearing and its lubricant, the sleeve is formed with a flange 51 defining a groove 52 which is adapted to contain a packing 53 of synthetic rubber or the like. A gasket 54 is located adjacent the inner race of the bearing, this gasket being of suitable material to have a slight degree of flexibility so that it will yield during rotation sufficiently to maintain the parts of the seal in accurate running engagement. While it may be made of fiber it is preferably made of a sheet of aluminum, copper, or soft bronze which will give the desired flexibility and which is non-absorptive of moisture.

A sealing ring 55 having a part fitting over the end of the sleeve and abutting against the flange 51 is supported thereon for rotation with the sleeve. The ring 55 is of steel which is preferably very hard with an optically polished surface which is adapted to bear against a similar surface of a non-rotating seal, metal being used for ring 55 to facilitate the transfer of heat away from the running surface. The stationary seal of carbon or like material is shown at 57, being held in an annular housing 58 having an essentially Z shape in cross section. The outer flange of housing 58 is connected to a flexible diaphragm 59 which in turn is bolted to the web 33 by means of bolts 60. Diaphragm 59 may be made of a corrugated sheet of soft metal such as aluminum, but is preferably formed of a sheet of synthetic rubber. An outer cover 61 is also bolted in place, and a compression spring 62 is received inwardly thereof, bearing against the outer flange of housing 58 to maintain close running and continuously sealed engagement between the two seal faces 55 and 57.

The surfaces of the two seal members 55 and 57 which are in running contact with each other are highly polished, it being more particularly important to obtain a smooth surface initially on the harder of the members, since the softer element will be worn smooth. A high degree of accuracy is desired on the surface of the steel element 55, the surface being hardened to a hardness of 50 to 55 Rockwell. The sides are maintained parallel to within 0.0001 inch and the opposite surfaces are lapped to a flat condition with great accuracy, preferably to within one light band. This gives a close and highly accurate seal in which with only a limited amount of axial pressure the running joint is maintained effectively closed to the passage of lubricant, throughout the wide range of temperatures to which it may be subjected in an aircraft installation, the absence of substantial pressure avoiding excessive friction and the resulting losses, high temperature and possibility of warpage.

The sleeve 50 carries the rotor element 65, which has suitable windings thereon the connections to which are made through slip rings 66 and 67 supported on the sleeve. These slip rings are suitably insulated from each other and from the sleeve 50 by means of a collar 68 of insulating material such as a molded plastic, and are preferably arranged so that their outer periphery is substantially flush with that of the collar. In order to make the machine as compact as possible, the slip rings are located closely adjacent the laminations, and within the end part 30 of frame 12. Since it is not feasible to mount the brushes in radial alignment with the rings, to make it possible to maintain the compact arrangement desired, the brushes 70 and 71 are mounted in a location axially offset with respect to the rings and extend inwardly toward the respective rings in an inclined direction. In order to assure proper electrical contact under all conditions of flight, a pair of diametrically opposed brushes are used on each ring so that if the pressure on one brush should be reduced by centrifugal force acting as a result of the motion of the airplane, or as a result of gunfire or other unusual reaction the force on the other brush will be increased. The brushes are mounted in the four equally spaced arms 32, one pair being offset axially with respect to the other. In this way the brushes are readily accessible for removal and replacement, connections to the exciter being made through binding posts 73 and conductors 74. As will be understood, in the case of an alternator, direct current is supplied through the slip rings to the rotor, and the alternating current is generated in and delivered from the stator.

Where the speed of the drive source of power is not sufficiently high to actuate the alternator directly to produce a frequency as high as desired, it is necessary to increase the speed at which the alternator is driven, that being accomplished in the present case by means of drive and gearing mechanism which is contained within the housing of the alternator itself. For this purpose the overhanging end of sleeve 50 beyond bearing 46 is provided with gear teeth 75. An idler gear train comprising a gear 77 is adapted to mesh with the gear teeth 75. The idler gear train includes the pinion 78 which together with gear 77 is keyed to shaft 79 by means of key 80. Shaft 79 is rotatably supported at one end by ball bearing 81 seated in ring 82 carried in bore 40 of web 33 and by another ball bearing 83 seated in ring 84 carried in bore 39 of web 37. As described above the respective bores are accurately located and this construction thus assured both great accuracy and strength.

A plurality of such idler gear trains are provided which are distributed symmetrically around the periphery of the sleeve, to thereby provide for substantially equalized distribution of the driving force around the periphery thereof, three such trains being shown, each of the gears 77 being meshed with the drive teeth 75.

The several pinions 78 mesh with the centrally located gear 86 which is spline connected as shown at 87 to the drive shaft 88 which extends through the sleeve 50. At one end the shaft is journaled in ball bearing 90 which is received within ring 91 located in bore 38 of web 37. The end of the shaft is threaded and receives a nut 92 which retains the bearing in place.

The shaft is likewise rotatably supported through the provision of an alloy bushing 93 secured internally of the end of sleeve 50, the bushing extending axially of the sleeve substantially from the outer end thereof formed with the gear teeth 75 to the position corresponding with the flange 51. The remainder of the drive shaft is of slightly reduced diameter and extends internally through the entire length of sleeve 50 with a small clearance therebetween. At its remote end, the drive shaft projects beyond the sleeve and is formed with suitable drive means such as spline teeth 95 thereon, but no additional bearing is provided adjacent this end of the shaft.

The spline 95 is adapted to be received in a corresponding spline-shaped driving member with the shaft 88 thus being free to float with the driving member. The shaft is so arranged that by reason of its reduced diameter as above described it has sufficient flexibility to permit the necessary flexing as well as absorbing the torsional variation of the driving member. The end cap 25 may be formed with a lubricant seal 96 to prevent escape of lubricant along the shaft. Similarly the ball bearing 24 is sealed by sealing means 97 to prevent passage of lubricant along the sleeve and into the motor.

In order to provide for the travel of lubricant in the space between the sleeve and shaft, the inner cylindrical surface of the sleeve 50 is provided with a spiral groove 100 as shown in Fig. 4. This groove is relatively small, but is found to provide for the effective feeding of lubricant throughout the entire length of the sleeve and shaft. Where desired, a straight groove 101 may also be provided which intersects the spiral grooving 100, providing a relief for the lubricant supplied and avoiding the delivery of excessive fluid along the shaft.

A metal shell 104 is received over the end of frame 12 to enclose the same and has a flanged part 105 which is engaged over a gasket 106 and bolted as shown at 107 to radially projecting flanges 108 formed integrally with the intermediate part 33 of the frame, thereby forming an enclosing chamber for the lubricant. Spaced therefrom is an outer housing 110 which is also secured in place on flanges 108, leaving a passage 111 for the flow of cooling air over the shell 104. An inlet opening 112 is provided at one side of housing 110, and the entire housing is preferably rotatable about its axis to direct the inlet in any desired direction throughout the full 360°, so that it may be set to project into an airstream as desired.

In order to maintain the space 111 closed throughout this adjusting movement of the air inlet and to provide escape of any differential pressure inside and outside the gear chamber, a stud 115 is secured in place on the axis of shell 104 and extended through the housing 110. A nut 116 is received on its threaded end which retains a connecting member 117 in place, such member having an annular flange which fits into an aperture in the housing, to maintain a sealed relation while supporting the housing for rotation. The stud is provided with an axial bore 118 which extends through the end of casing 104 and thus provides communication with the gear chamber. The bore is filled with a semiporous material such as sintered bronze which effectively prevents passage of dust or dirt while at the same time providing relief for any change of pressure within the gear chamber caused by heating or cooling, change of altitude, or the like. Since the passage is directly on the axis of rotation there is little tendency for lubricant to escape, the centrifugal force tending to discharge the lubricant radially outwardly of the passage and thus within the sealed casing 104.

A removable cover 120 is contoured to fit over the terminal block 19, and encloses the body of the frame 12 forming a substantially smooth outer cylindrical surface. This cover rests on flanges 108 of web 33 and on similar flanges 121 formed on end ring 30, thus forming a plurality of axially extending passages 122 for the flow of cooling air. A further cover member 125 encloses the main body of the motor, frame portion 10 being similarly formed with spaced radially projecting flanges 126 leaving air flow passages 127 for the flow of cooling air, the passages being open where they extend between the flanges 128 of frame member 14 for the escape of the air.

In providing a dynamoelectrical machine which has high capacity with low specific weight per horsepower output, it is important to obtain the most effective use of the electric and magnetic materials present in addition to the most efficient utilization of the physical strength properties of the materials. In accordance with this invention the winding is desirably formed of copper bars of solid cross-section which may be so shaped that the bar corresponds to and substantially fills the section of the slot, thus providing a high filling factor. However such a winding is quite stiff and difficult to assemble in a compact space without requiring an undesirably large space at the ends for making the cross connections, which not only would result in added space requirements, but would increase both the resistance and the weight of the winding as well. If the coils are completely preformed it is difficult to assemble the coils in the stator slots, particularly with a machine of relatively small diameter. If the coils are preformed at one end with the conventional diamond shape and the cross connections at the other end made after the coils are in place in the slots, it is difficult to make such interconnections with a small amount of wire and in a limited space and the winding thus requires additional space as well as copper and results in increases in weight and electrical resistance.

In accordance with this invention the windings are in the form of solid bar sections which are preshaped into generally hairpin shape. The integral part at the loop of the hairpin is formed into the necessary number of different shapes to establish the proper coil connections, the opposite ends being initially left open in symmetrical disposition and extending parallel to each other. In a common form of three phase stator winding containing two slots per phase per pole and with two conductors per slot, it will be apparent on analysis that there are seven basic shapes or forms of cross connections which are required, Some of these shapes are used more often than others, but the entire winding may be formed with the use of the specified number of different shapes.

Figure 9:
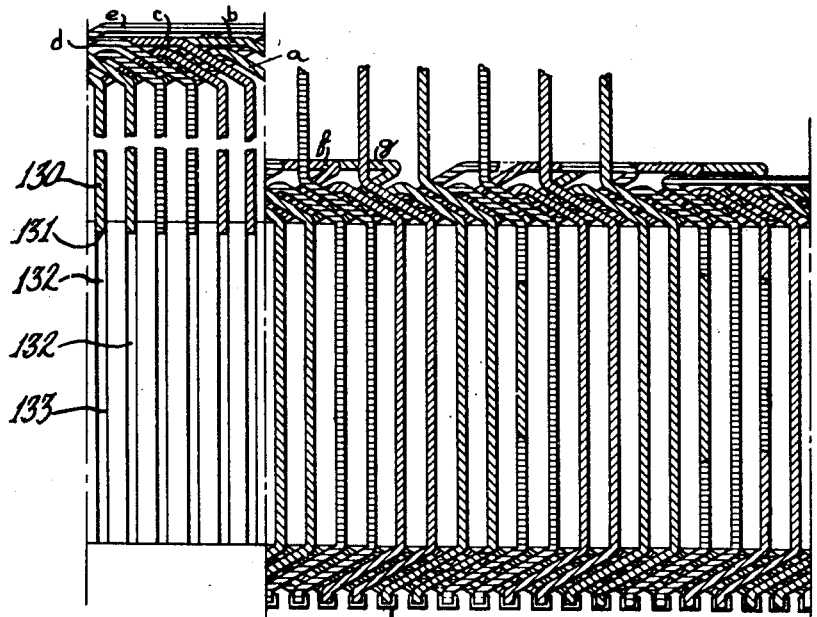
Fig. 9 is a fragmentary developed plan view of the stator winding showing the manner of assembling the winding in the slots, the coils as initially formed and inserted in the ends of the slots being shown at the left-hand part of the figure, the remainder of the figure showing the coils in their assembled and operative position.

Fig. 9 shows the arrangement of the stator winding 130 with the coils at the left-hand part of the figure being assembled in compact nested relation with each other, and open ends 131 extending partially into the slots 132. Suitable insulators 133 of paper or like material are placed in the slots prior to the introduction of the coils. As indicated, each slot carries two conductors, arranged one above the other, and with the section of each conductor substantially filling the cross width of the slot. The seven different forms are designated by reference letters *a* to *g* inclusive. As shown the corresponding conductors of each adjacent pair of slots are crosshatched similarly to indicate conductors of the same phase, and in certain of the slots the upper conductor is broken away to show the lower conductor.

Figure 10:
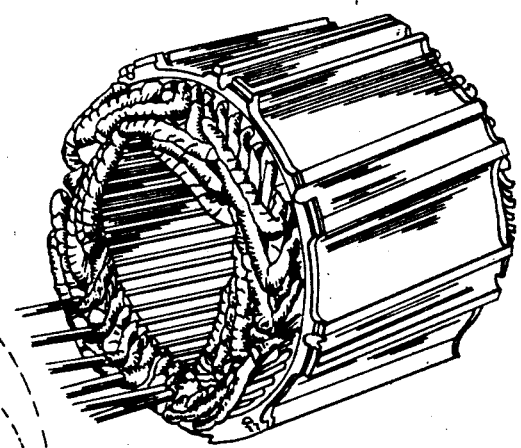
Fig. 10 is a view in perspective showing the arrangement of the cross connections at one end of the stator winding.

The coils are initially assembled in this way around the entire periphery of the stator and are then pressed lengthwise to the final operative position indicated at the right-hand part of Fig. 9. Since all of the coils are moved as a unit, they do not change their position relative to each other, and in this way the most economical and compact arrangement of the connections is established, the final appearance of the windings at this end of the machine being as indicated in Fig. 10.

Figure 11:
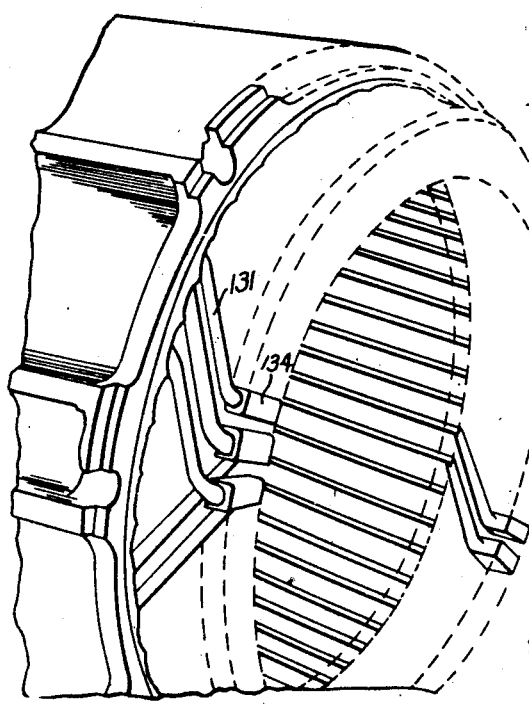
Fig. 11 is a partial view in perspective showing the connections which are made at the opposite end of the winding.

The overhanging ends 131 of the conductors are all bent in a uniform manner, those of the upper series in one direction and those of the lower series in the opposite direction to bring the ends of corresponding conductors into radial alignment with each other. The coils are then closed by establishing electrical contact between the two adjacent coil ends, preferably through the use of a clip 134 to which both ends are welded, suitable insulating strips being used to prevent contact between the conductors. Fig. 11 shows only a few of the upper and lower conductors in the slots to indicate the pattern which is followed.

Thus a simple operation only is required at this end of the stator, without the necessity of forming the different shapes and cross connections which are necessary at the opposite end. Since the ends are all uniformly bent, the requirements of length of wire and amount of space are both reduced to a minimum, thus maintaining the desired condition of efficient and effective use of space and materials at both ends of the machine, and contributing to the obtaining of high performance characteristics with limited weight and size requirements.

The following is given as a specific example of a construction of alternator in accordance with this invention. The generator had a frequency of 400 cycles at 2000 R. P. M. increasing to 800 cycles at 4000 R. P. M. and was three phase delta connected. The gear ratios are such that the sleeve 50 and the rotor 65 are driven at three times the speed of the drive shaft 88. The clearance between the sleeve and the drive shaft is approximately 0.15 inch over-all, and the spiral groove 100 has a depth of approximately 0.01 inch. The alternator has an output of 28.5 volts and a rating of 285 amperes per terminal and the total weight of the machine was 47 pounds. With this construction a continuous output of 15 kilowatts has been obtained, corresponding to about 20 horsepower, and up to about 20 kilowatts output has been obtained as a temporary condition, this representing ratios of approximately 2.35 and 1.74 pounds per horsepower, respectively. The filling factor of the stator slots was 68%.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A dynamoelectric machine of the character described which comprises a supporting frame, a stator supported by said frame, a gear chamber formed in said frame, a rotor, a sleeve for supporting said rotor, a drive shaft, gearing within said gear chamber interconnecting said drive shaft and said sleeve, a casing overlying and enclosing said gear chamber, an outer housing spaced from said casing leaving an air flow passage therebetween, said housing having an air inlet opening, and means on said frame for supporting said housing for adjustment about its axis to direct said opening in any desired direction.

2. A dynamoelectric machine of the character described which comprises a supporting frame, a stator supported by said frame, a gear chamber formed in said frame, a rotor, a sleeve for supporting said rotor, a drive shaft, gearing within said gear chamber interconnecting said drive shaft and said sleeve, a casing overlying and enclosing said gear chamber, an outer housing spaced from said casing leaving an airflow passage therebetween, a member extending from said casing to the exterior of said housing in sealed relation with respect to the latter, said member having a passage extending therethrough, and a porous material in said passage excluding access of foreign matter into said gear chamber while providing for flow of gases therethrough for the breathing of said chamber.

3. A dynamoelectric machine of the character described which comprises a supporting frame, a stator supported by said frame, a gear chamber formed in said frame, a rotor, a sleeve for supporting said rotor, a drive shaft, gearing within said gear chamber interconnecting said drive shaft and said sleeve, a casing overlying and enclosing said gear chamber, an outer housing spaced from said casing leaving an airflow passage therebetween, a member extending from said casing to the exterior of said housing in sealed relation with respect to the latter, said member having a passage extending therethrough substantially in line with the axis of said drive shaft such that lubricant within said gear chamber tends to be discharged outwardly of said passage by centrifugal force.

4. A dynamoelectric machine of character described which comprises a frame structure including a central portion and two end portions, a stator supported in said central portion, bearings in said end portions a rotor, a sleeve rotatably supporting said rotor, a drive shaft extending through said sleeve, said sleeve and said drive shaft being journaled in said bearings, radially extending flanges formed on the outer surface of said frame portions leaving recesses therebetween extending substantially over the length of said machine, and a detachable housing overlying and supported on said flanges for enclosing said frame and forming air flow passages with said recesses for the flow of cooling air therethrough.

EARL B. GEORGE.
BERNARD E. WALLACE.
ROBERT S. WATERS.

REFERENCES CITED

The following references are of record in the file of this patent:

UNITED STATES PATENTS

| Number | Name | Date |
|---|---|---|
| 824,187 | Lowe | June 26, 1906 |
| 1,064,736 | James | June 17, 1913 |
| 1,442,217 | H'Doubler | Jan. 16, 1923 |
| 1,488,985 | Hoge | Apr. 1, 1924 |
| 1,563,945 | Apple | Dec. 1, 1925 |
| 1,734,497 | Limpert | Nov. 5, 1929 |
| 1,843,589 | Apple | Feb. 2, 1932 |
| 1,863,202 | Krohn | June 14, 1932 |
| 1,930,312 | Greenhoe | Oct. 10, 1933 |
| 1,935,211 | Krohn | Nov. 14, 1933 |
| 2,107,481 | Johnson | Feb. 8, 1938 |
| 2,164,837 | Pfleger | July 4, 1939 |